(12) United States Patent
Flanders et al.

(10) Patent No.: US 6,776,536 B1
(45) Date of Patent: Aug. 17, 2004

(54) INTEGRATED OPTICAL SYSTEM MONITORING SYSTEM

(75) Inventors: Dale C. Flanders, Lexington, MA (US); Peter S. Whitney, Lexington, MA (US)

(73) Assignee: Axsun Technologies, Inc., Billerica, MA (US)

( * ) Notice: Subject to any disclaimer, the term of this patent is extended or adjusted under 35 U.S.C. 154(b) by 0 days.

(21) Appl. No.: 09/648,413

(22) Filed: Aug. 25, 2000

Related U.S. Application Data

(60) Provisional application No. 60/186,800, filed on Mar. 3, 2000.

(51) Int. Cl.$^7$ .................................................. G02B 6/36
(52) U.S. Cl. .............................. 385/88; 385/94; 372/6
(58) Field of Search ................................ 385/1, 88, 89, 385/92, 93, 94; 359/237, 154, 180, 189, 110, 113, 114, 124, 130; 372/6, 20

(56) References Cited

U.S. PATENT DOCUMENTS

| | | | | |
|---|---|---|---|---|
| 4,781,425 A | * | 11/1988 | Risk et al. ..................... 385/1 |
| 5,027,435 A | | 6/1991 | Chraplyvy et al. .......... 455/617 |
| 5,321,539 A | * | 6/1994 | Hirabayashi et al. .......... 349/1 |
| 5,812,307 A | | 9/1998 | Naganuma ................... 359/341 |
| 6,023,542 A | | 2/2000 | Pan et al. ....................... 385/24 |
| 6,088,147 A | * | 7/2000 | Weber, deceased et al. 359/237 |
| 6,192,058 B1 | * | 2/2001 | Abeles ........................... 372/6 |
| 6,262,822 B1 | * | 7/2001 | Obhi et al. .................. 359/130 |
| 6,310,703 B1 | * | 10/2001 | Alavie et al. ............... 359/110 |

FOREIGN PATENT DOCUMENTS

| | | | |
|---|---|---|---|
| DE | 198 16 612 A1 | 10/1999 | .......... H04B/10/08 |
| EP | 0 723 170 A2 | 7/1996 | ............ G02B/6/42 |
| EP | 0 773640 A2 | 5/1997 | ......... H04B/10/158 |
| WO | WO 99/15928 | 4/1999 | ............ G02B/6/42 |
| WO | 99/34484 | 7/1999 | |

OTHER PUBLICATIONS

MEM–TUNE Tunable Filter, Preliminary Data Sheet DS00533, May 2000, CoreTek, Inc., 299 Ballardvale Street, Wilmington MA 01887.

OPM–1 Optical Performance Monitor, Preliminary Data Sheet, DS00555, May 2000, CoreTek, Inc., 299 Ballardvale Street, Wilmington, MA 01887.

Yamashita, J., et al., "Optoelektronische Module für die faseroptische Nachrichtentechnik," *Fernseh– Und Kino–Technik, 46*, No. 6, Jahrgang–Nr., pp. 402–404 (Jun. 1992).

* cited by examiner

*Primary Examiner*—Euncha Cherry
(74) *Attorney, Agent, or Firm*—J. Grant Houston

(57) ABSTRACT

An integrated optical monitoring system comprises a hermetic package and an optical bench sealed within a package. An optical fiber pigtail enters the package via a feed-through to connect and terminate above the bench. A tunable filter is connected to the top of the bench and filters an optical signal transmitted by the fiber pigtail. A detector, also connected to the bench, detects the filtered signal from the tunable filter. Thus, the entire system is integrated together, on a single bench within a preferably small package. This configuration makes the system useful as a subsystem, for example, in a larger system offering higher levels of functionality and optical signal processing capability.

24 Claims, 9 Drawing Sheets

INTEGRATED OPTICAL SYSTEM MONITORING SYSTEM

RELATED APPLICATIONS

This application claims the benefit of the filing date of U.S. Provisional Application No. 60/186,800, filed Mar. 3, 2000, which is incorporated herein by this reference in its entirety.

BACKGROUND OF THE INVENTION

Wavelength division multiplexing (WDM) systems typically comprise multiple separately modulated laser diodes at the transmitter. These laser diodes are tuned to operate at different wavelengths. When combined in an optical fiber, the WDM optical signal comprises a corresponding number of spectrally separated channels. Along the transmission link, the channels are typically collectively amplified in gain fiber, such as erbium-doped fiber and/or regular fiber, in a Raman pumping scheme. At the receiving end, the channels are usually separated from each other using thin film filter systems, to thereby enable detection by separate photodiodes.

The advantage of WDM systems is that the transmission capacity of a single fiber can be increased. Historically, only a single channel was transmitted in each optical fiber. In contrast, modern WDM systems contemplate hundreds or thousands of spectrally separated channels per fiber. This yields concomitant increases in the data rate capabilities of each fiber. Moreover, the cost per bit of data for WDM systems is typically less than comparable non-multiplexed systems. This is because any amplification system required along the link can essentially be shared by all of the separate channels transmitted in a single fiber link. With non-multiplexed systems, each channel/fiber would require its own amplification system.

Nonetheless, there are challenges associated with implementing WDM systems. First, the transmitters and receivers are substantially more complex since, in addition to the laser diodes and receivers, additional optical components are required to combine the channels into, and separate out the channels from, the WDM optical signal. Moreover, there is the danger of channel drift where the channels loose their spectral separation and overlap each other. This interferes with channel separation and demodulation at the receiving end.

SUMMARY OF THE INVENTION

In order to ensure that proper guard bands are maintained between adjacent channels and to also ensure that the carrier frequencies or wavelengths of the channels are correct both relative to other channels and relative to their wavelength assignments, optical monitoring systems are required in most WDM transmission systems. They are also useful in WDM channel routing systems, such as add/drop multiplexers and switches to ensure that the specific optical channels are being property controlled. Further, information concerning the relative and absolute powers in the optical channels is important as feedback to variable attenuators, for example.

Historically, however, optical monitoring systems have been relatively large, complex systems. Their size and complexity, and resulting maintenance requirements, prevented them from being integrated into systems offering high levels of functionality such as cross-connect switches, amplifier systems, and integrated receivers, monitoring systems and transmitters, for example.

The present invention concerns an optical monitoring system that is capable of being integrated into a small package to be used as a subsystem, or possibly even as a stand-alone system, in a WDM system, or other application requiring optical spectral monitoring.

In general, according to one aspect, the invention features an integrated optical monitoring system. It comprises a hermetic package and an optical bench sealed within the package. An optical fiber pigtail enters the package via a feed-through to connect to and terminate above the bench. A tunable filter, connected to the top of the bench, filters an optical signal transmitted by the fiber pigtail. A detector, also connected to the bench, detects the filtered signal from the tunable filter. Thus, the entire system is integrated together, on a single bench within a preferably small package. This configuration makes the system useful as a subsystem, for example, in a larger system offering higher levels of functionality and optical signal processing capability.

In the preferred embodiment, an isolator is also integrated onto the bench to prevent back reflections into the fiber pigtail.

The preferred embodiment uses a reference signal source, also preferably integrated on the optical bench that generates a reference signal, which is filtered by the tunable filter. Such a reference signal enables absolute measurements of optical signal wavelength to ensure that each optical signal is broadcasted at the proper wavelength and to detect such problems as wavelength drift across all of these signals. As a result, the system is capable of detecting absolute frequency, in addition to ensuring that guard-bands are maintained between adjacent channels, for example.

In the current embodiment, the reference signal source comprises a broadband source and an etalon. The etalon converts the broadband signal from a super luminescent LED (SLED), for example, into a signal with stable spectral characteristics.

In other embodiments, two physically discrete tunable filter cavities are utilized. Typically, the cavity tuning is synchronized to obtain net signal transmission through both cavities.

In general, according to another aspect, the invention is also characterized as a method for constructing an integrated optical monitoring system. This method comprises installing an optical bench in a hermetic package. A fiber pigtail is inserted through a fiber feed-through, into the package, and terminated on the optical bench. A tunable fiber is also installed on a top of the bench to filter an optical signal from the fiber pigtail. Finally, a detector is installed on the bench to detect the filtered optical signal from the tunable filter.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
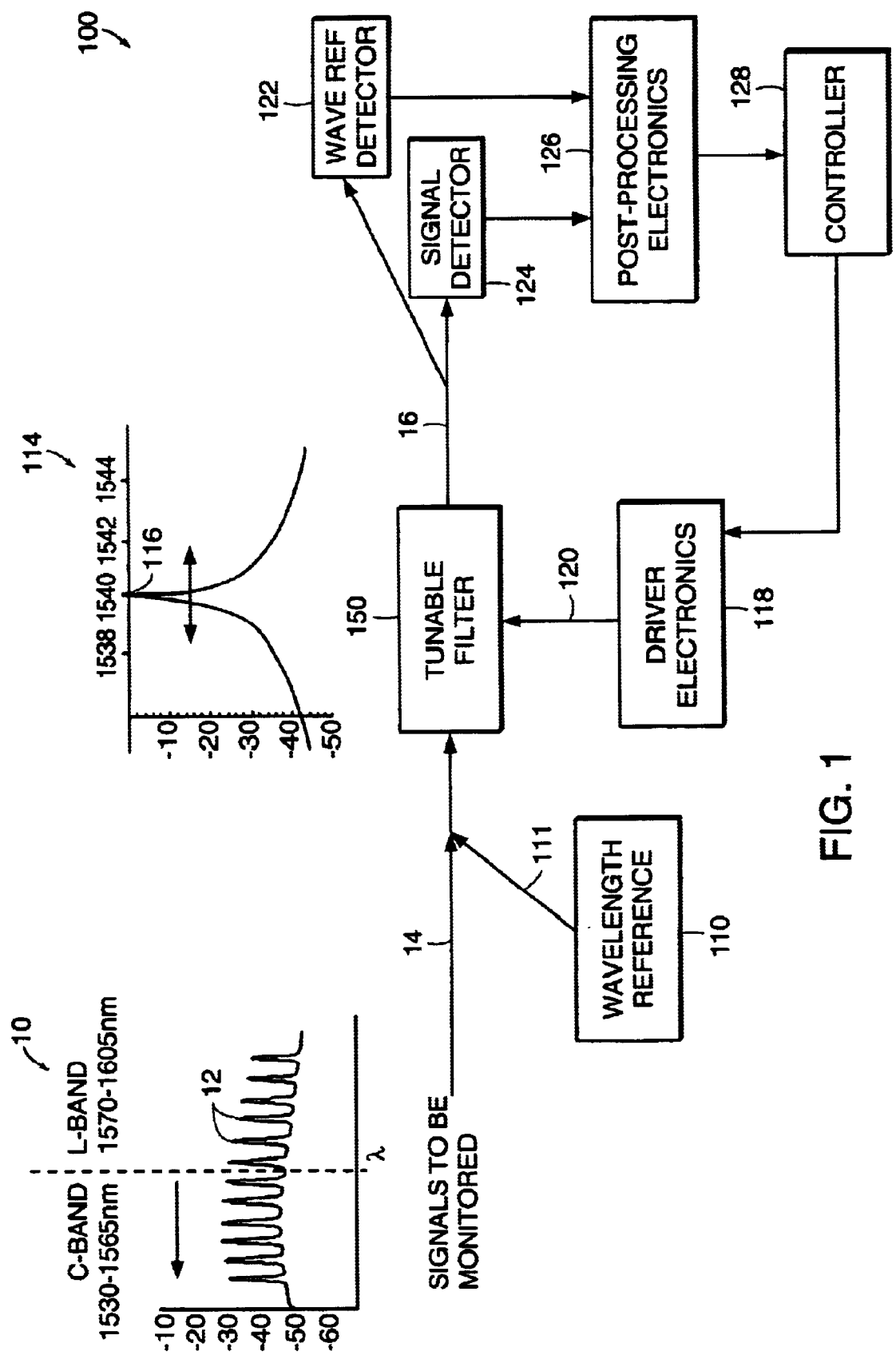
FIG. 1 is a schematic, block diagram illustrating a first embodiment of the optical monitoring system with insets showing the spectral characteristics of the WDM signal and filter transfer function; according to the present invention.

FIG. 1 illustrates an optical system monitoring system 100, which has been constructed according to the principles of the present invention.

In the preferred or typical implementation, the system receives a WDM signal 14, the spectral characteristics of which are illustrated by inset plot 10. Specifically, plot 10 shows power as a function of wavelength. The WDM signal 14 comprises multiple channels or modulated carrier signals 12. In the present scheme, these channels are distributed in two bands, typically termed the C-band, which stretches from 1530 to 1565 nm, and the L-band, which stretches from 1570–1605 nm.

The WDM signal 14 enters the monitoring system 100. According to the first embodiment, a wavelength reference signal 111 from a reference source 10 is added to the WDM signal 14. The combined WDM and wavelength reference signal 14/111 is then filtered by a tunable filter 150. Inset plot 114 illustrates an exemplary filter transfer function for the tunable filter 150. The transmission peak 116 is variable based upon a control signal 120, which is generated by the driver electronics 118 under control of the controller 128. The driver electronics include includes a DC-DC power supply, a ramp generator, a thermoelectric cooler drive circuit, and LED driver.

The combined optical signal 16, which has been filtered by the tunable filter, includes both the filtered wavelength reference signal and the filtered WDM signal 14. The filtered reference signal is then detected by a reference detector 122, and the filtered WDM signal is detected by a signal detector system 124. These detectors yield electronic signals that are received by post processing electronics 126. A subsequent controller 128 performs analysis functions such as channel inventory.

In the preferred embodiment, the post processing electronics 126 includes optical receiver circuits, the signal and wavelength reference and digital hardware, including an analog to digital converter.

Preferably, each detector operates in a differential detection scheme to minimize common-mode noise with gain-switching multiplexor to increase dynamic range. Gain switching is performed with a 4:1 multiplexor and several resistors. This configuration allows for different receiver sensitivities to be obtained via software command of the processor 128. The advantage of doing this is to allow for an increased dynamic range. Each scan is performed several times at different gains and a recorded signal is combined in software.

In the preferred embodiment, the analog to digital converter samples at 200 kilo-samples per second to one Megasamples per second. The controller 128 with the required RAM allows for the storage for samples and processing.

According to the preferred embodiment, the optical channel monitoring system of FIG. 1 has a number of different modes of operation. In a basic mode, that is a single channel scan, an increasing ramp voltage is applied to the tunable filter 150. This drives the changes in the size of the Fabry-Perot cavity of the filter 150 in a quasi-linear fashion. Because of the self calibration, the particular characteristics of the voltage ramp are not critical, since continuous calibration is performed by the inclusion of the out of band reference signal.

Figure 2:
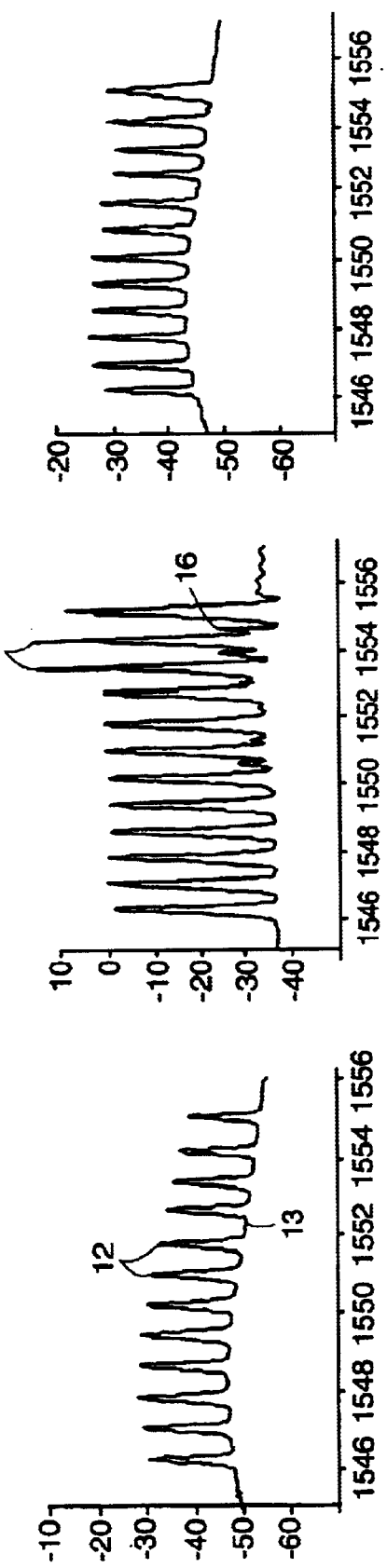
FIGS. 2A, 2B, and 2C are spectral plots of exemplary WDM signals illustrating various problems that can be diagnosed with the optical channel monitoring system of the present invention.

FIGS. 2A, 2B, and 2C illustrate different problems that can be characterized by the optical system monitoring system 100. For example, in FIG. 2A, the relative strengths of the signals 12, along with their absolute signal strengths relative to the noise floor 14, are detectable. This information can be used as a control signal an upstream or downstream variable attenuator. As illustrated in FIG. 2B, inter-channel artifacts 16 are also detected. Finally, as illustrated in FIG. 2C, gain tilt problems, typically added by amplification systems, are also identifiable. Nonetheless, it should be understood that the present invention has applicability to many other applications where the spectral content of a signal is relevant.

Figure 3:
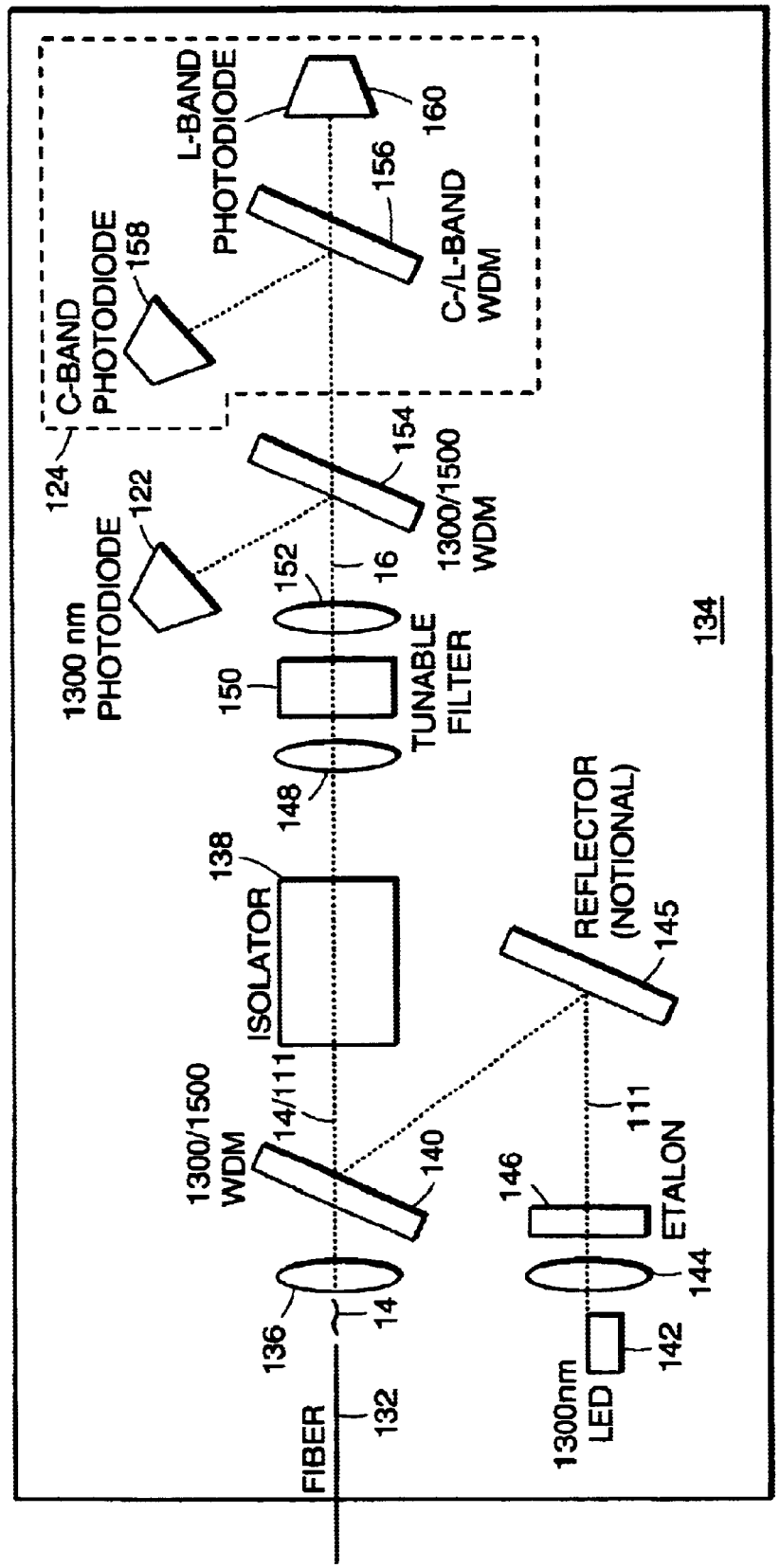
FIG. 3 is a more detailed block diagram illustrating the optical train of a first embodiment of the optical channel monitoring system of the present invention.

FIG. 3 shows the optical train of the optical channel monitoring system.

The fiber 132 terminates above an optical bench 134. The optical signal 14 is emitted out of the typically cleaved or cleaved-polished end-face of the fiber.

The optical signal is typically diverging as it is emitted from the fiber's core. It is collimated by a first collimation lens 136. Preferably, all lenses are formed utilizing mass-transport processes as described in U.S. Pat. No. 5,618,474, the teachings of which are incorporated herein by this reference in their entirety. The invention, however, is compatible with other types of microlenses such as those generated by diffractive, binary optics, gradient index processes, or refractive element replication, for example.

A dichroic mirror 140 is used to add the reference signal 111 to the optical signal 14. These dichroic mirrors or filters are typically referred to as WDM filters. In the illustrated implementation, the WDM filter 140 is reflective in a band surrounding 1300 nm, but transmissive in a band surrounding 1500 nm.

In the illustrated embodiment, the 1300 nm reference signal is generated by a light emitting diode 142. In one implementation, the light emitting diode is a super luminescent light emitting diode (SLED).

The diverging beam from the LED is collimated by a second collimating lens 144. An etalon 146 is used to convert the relatively wide-band signal from the SLED into a reference signal with stable spectral characteristics. More specifically, the etalon 146 functions as a Fabry-Perot filter with a 200 GigaHertz (GHz) free spectral range (FSR). This effectively converts the SLED's continuous, broadband spectrum into a signal with energy peaks every 200 GHz These peaks are stable, particularly when the temperature of the system is controlled by a thermoelectric cooler or is otherwise stabilized.

A fold mirror 145 redirects the reference signal to the WDM filter 140. It should be noted, however, that this mirrors is not required, but is simply used to facilitate integration of the system on a compact bench.

The combined optical signal 14/111 is transmitted through an isolator 138. This component is used to prevent back-reflections from the subsequent optical components into the fiber 132.

A first focusing lens 148 is used to focus the collimated combined beam 14/111 onto a tunable filter 150. After the tunable filter, the beam is recollimated by a third collimating lens 152, and transmitted to a second dichroic/WDM filter 154.

The second WDM filter 154 functions to separate the filtered reference signal from the filtered optical signal in the filtered beam 16 from the tunable filter 150. In the illustrated implementation, the second WDM filter 154 is reflective in a band around 1300 nm, but transmissive in a band around 1500 nm. As a result, the filtered reference signal is directed to the wavelength reference detector 122 for optical-electrical conversion.

The filtered optical signal is transmitted to the signal detector system 124. In the illustrated embodiment, the L- and C-bands are separated from each other by a third WDM filter 156. This WDM filter 156 is reflective to the C-band and transmissive to the L-band. As a result, the C-band of the WDM signal is detected by a C-band photodiode 158; the L-band is transmitted through the WDM filter 156 to be detected independently by an L-band photodiode 160. In other embodiments, more that two bands, such as three or four, are detected simultaneously by adding additional WDM filters and detectors.

The FIG. 3 embodiment provides for out-of-band calibration. This yields the advantage that the calibration can occur simultaneously with wavelength monitoring. Specifically, one or more of the filter's modes are used for signal detection while another mode is used to simultaneously filter the calibration signal.

In alternative embodiments, a similar stable source is used for in-band calibration. One downside to such embodiments, however, is the fact that complex post processing and/or time multiplexing functionality is required upstream of the detectors to switch between signal monitoring and signal calibration.

In alternative embodiments, other LED sources are used, such as LED sources operating at approximately 1400 nm, such as an InGaAsP SLED.

The salient features of the tunable filter 150 are its selectable free spectral range. In the preferred embodiment, the free spectral range is 20 nm<FSR<170 nm at 1550 nm wavelength. It preferably also has high finesse, i.e., greater than 3,000, and a compact size.

In the preferred embodiment, the filter is as described in patent application Ser. No. 09/649,168, by Flanders, et al., entitled Tunable Fabry-Perot Filter, filed on an even date herewith, this application is incorporated herein by this reference.

In the preferred embodiment, a 40 nm FSR is selected. This enables simultaneous scans of the C and L-bands, in addition to calibration relative to the reference band. Generally, to enable simultaneous scanning, the FSR of the filter must be greater than the bandwidth of at least one of the bands of interest so that successive modes of the filter can access both bands simultaneously. The FSR, however, must be less than the combined bandwidth of bands, again to enable simultaneous access. Generally, the FSR is determined by the length 1 of the Fabry-Perot cavity in the filter, FSR=2l/c.

This three-way simultaneous scanning reduces the total scan time while providing for simultaneous calibration. In other embodiments, the free spectral range of the tunable filter is increased to 57.5 nm to enable monitoring of the optical service channels that flank the C-and L-bands.

In some implementations, a spatial mode aperture is used in conjunction with the tunable filter. Such intra-filter apertures are desirable when extra cavity mode control devices are not used. For example, in some other implementations, a length of single mode fiber follows the filter to attenuate higher order modes.

Figure 4:
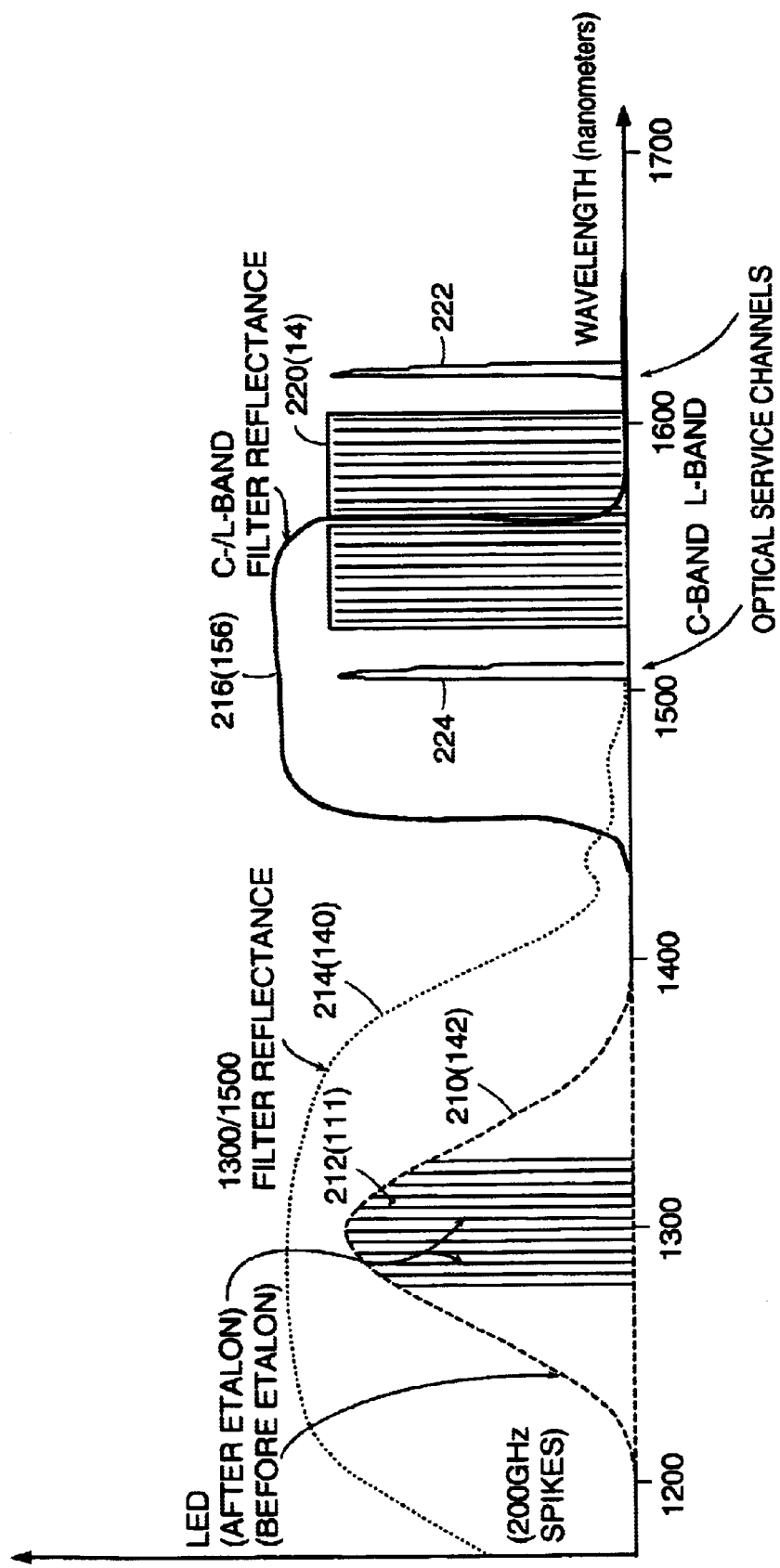
FIG. 4 is a spectral plot illustrating the WDM system and reference signals of the first embodiment of the optical channel monitoring system of the present invention.

FIG. 4 is a plot of power as a function of wavelength illustrating the spectral relationships between the active and passive optical components of FIG. 3 embodiment.

Plot 210 illustrates the spectrum of the light emitted by the SLED 142. As illustrated, it is a relatively broadband signal stretching from approximately 1250–1350 nm. The etalon, however, functions as a Fabry-Perot filter to convert the wideband output to a series of spikes spaced at 200 GHz centered around 1300 nm.

Plot 214 illustrates the reflectance of the first WDM filter 140. It is reflective in the 1300 run range, but transmissive around the 1550 nm range. This allows the combination of the reference signal 111 and the optical signal 14 to produce the combined signal 14/111.

Plot 220 shows an exemplary optical signal 14, comprising multiple energy spikes associated with each channel, stretching across the C and L-bands between approximately 1500 nm to over 1600 nm. Spectrally on either side of the channels are two optical service channels 222, 224, which can be used to transmit additional channel information.

Plot 216 is the reflectance curve of the third WDM filter 156. It has a sharp transition between the C and L-bands to thereby separate the two bands so that they can be separately detected by the C-band photodiode 158 and the L-band photodiode 160.

Figure 5:
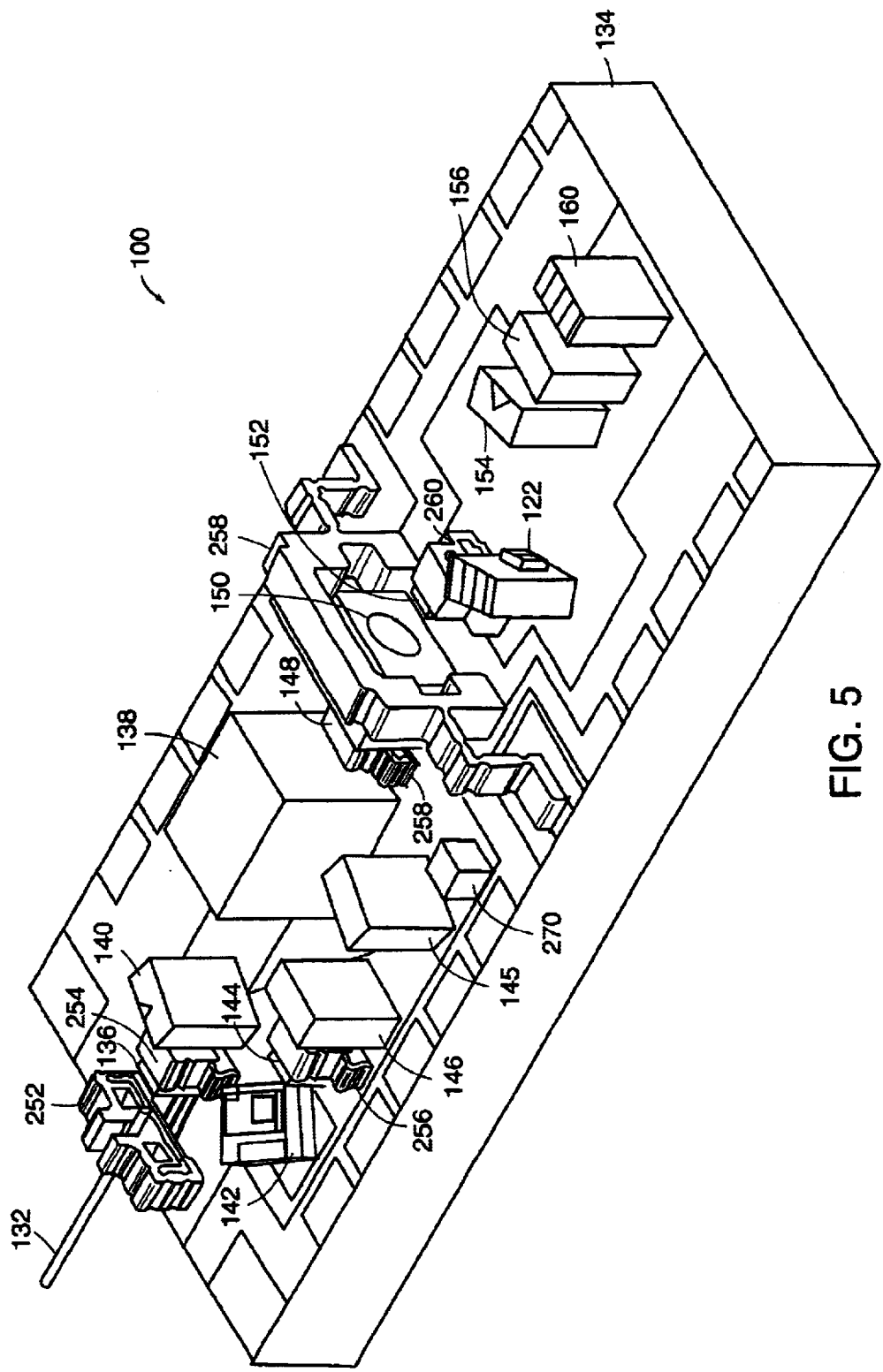
FIG. 5 is a perspective view of the integrated optical channel monitoring system of the first embodiment of the present invention.

FIG. 5 illustrates the integration of the optical channel monitoring system 100 on a single, miniature optical bench 134. It also illustrates a second embodiment of the optical channel monitoring system, which does not have separate detectors for the C- and L-bands. Instead, a single detector 160 is used to detect the optical signal. This has the advantage of simplified construction, but negates any opportunity for simultaneous C- and L-band scanning. One implementation relies on an increased filter spectral range of about 115 nm or greater to scan the entire signal band of interest. In other implementations, the C/L band WDM filter 156 is installed in front of the detector 160 to provide for C or L band scanning only.

Specifically, the fiber 132 is terminated on the bench 134 at a mounting and alignment structure 252. This mounting and alignment structure 252 holds the fiber in proximity to the first collimating lens 136 held on its own mounting and alignment structure 254.

In the reference signal optical train, the SLED 142 generates the broadband beam, which is focused by the second collimating lens 144 held on mounting and alignment structure 256. This collimates the beam to pass through the etalon 146 installed on the bench 134. The reference beam generated by the etalon is reflected by fold mirror 145 to the first WDM filter 140. As a result, the combined beam 14/111 is transmitted to the isolator 138, which is installed directly on the bench 134 in the illustrated implementation.

After the isolator, a focusing lens 148 held on mounting and alignment structure 258 focuses the combined beam onto the tunable filter 150, which is held on the filter mounting and alignment structure 258. The beam from the filter 150 is re-collimated by a third collimating lens 152 held on mounting and alignment structure 260. This beam is then separated into the reference beam and the optical signal by a second WDM filter 154. The reference signal is detected by detector 122. The filtered optical signal is transmitted through the second WDM filter 154 to the signal photodiode 160.

Figure 6:
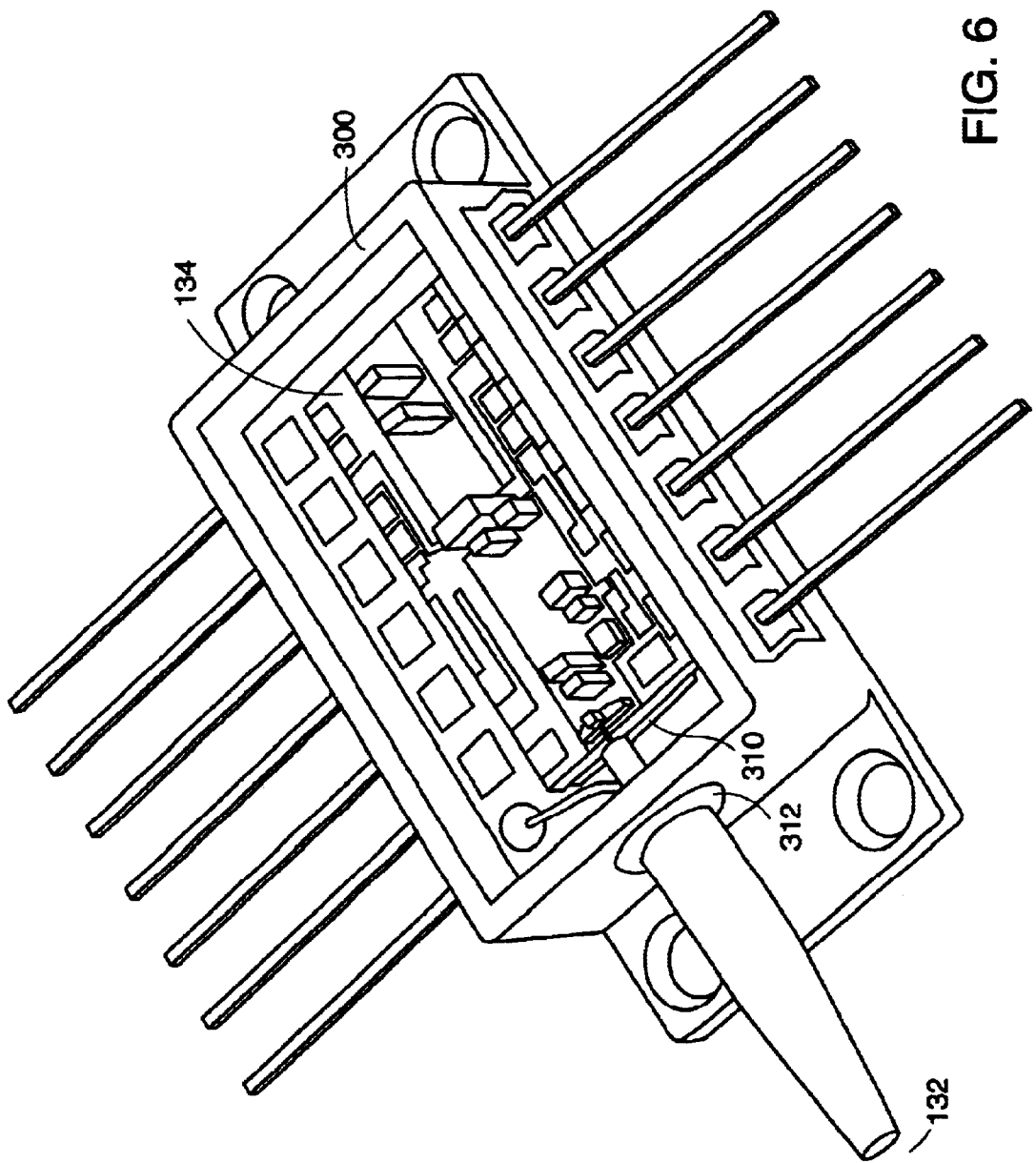
FIG. 6 is a partial perspective view showing a hermetic package with its top removed and the optical bench installed inside the package.

Also shown is the installation of the thermistor 270, which is used by the controller to control the package's thermoelectric cooler FIG. 6 illustrates the installation of the optical bench 134 into a hermetic package 300. The thermoelectric cooler 310 is installed under the bench 134. The optical fiber 132 passes through an optical fiber feed through 312 to terminate on the optical bench 134. In the figure, the hermetic package 300 has its top removed. Preferably, this is a standard 0.75×0.5 inch butterfly hermetic package.

Figure 7:
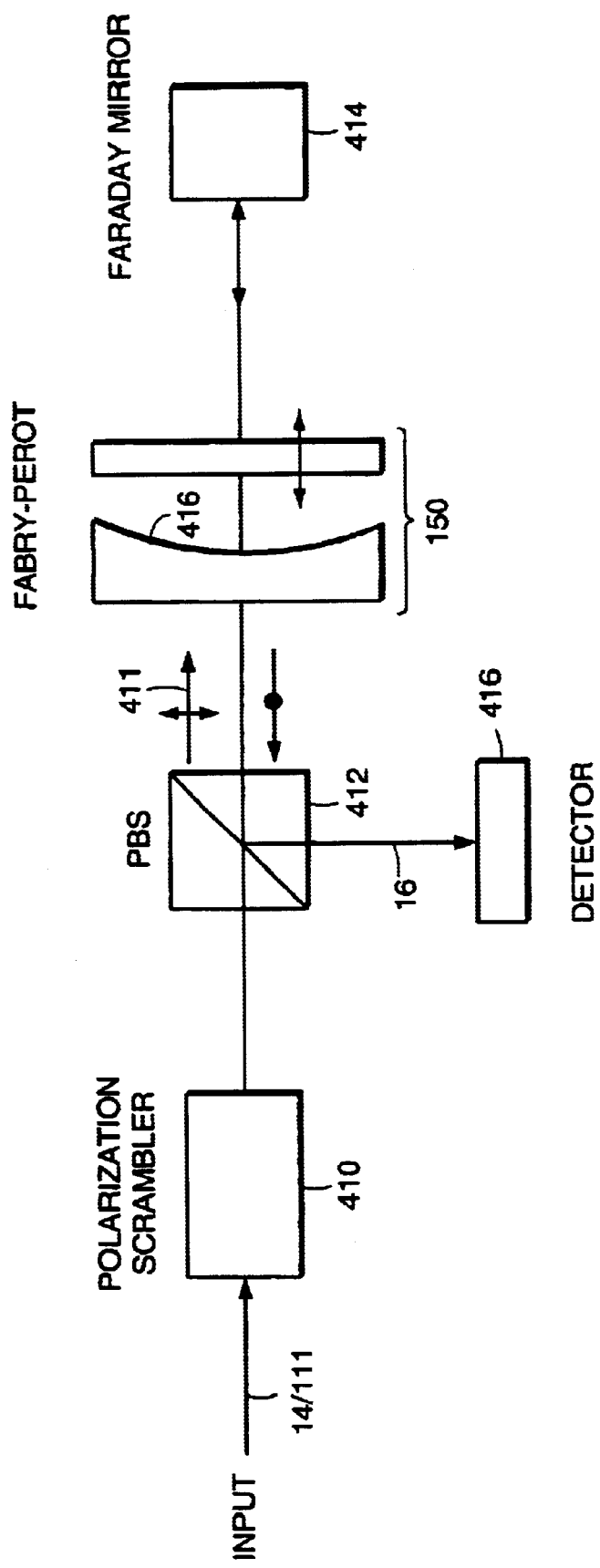
FIG. 7 is a schematic diagram showing an alternative implementation of a portion of the optical train surrounding the tunable filter in which the filter is arranged in a double pass configuration.

FIG. 7 is a block diagram illustrating the configuration of the tunable filter according to a third embodiment of the present invention. In this embodiment, the tunable filter 150 in FIG. 3, for example, is replaced with the illustrated system.

Specifically, the combined optical signaureference signal 14/111 from the isolator 138 is sent through a polarization scrambler 410. This yields an unpolarized signal, of which 50% passes through polarization beam splitter 412. The transmitted signal is indicated by reference numeral 411. The polarization scrambler ensures that the incoming beam has a uniform distribution of polarization states so that the polarization beam splitter always passes exactly 50% of the light. Without the scrambler, the incoming beam could have had its polarization state either parallel or perpendicular to the polarization beam splitter, or an intermediate state, meaning that the transmitted beam would have varied between 0 and 100%.

The optical signal essentially passes through two, series, synchronized Fabry-Perot filter cavities 416. This is accomplished by sending the signal to the right, in FIG. 7, through the tunable filter 150, reflecting the signal with a Faraday mirror 414 and then sending the signal back through the Fabry-Perot cavity 416 a second time. The Faraday mirror 414 has the effect of rotating the polarization of the beam 411 by 90 degrees.

The signal with the rotated polarization is separated by the polarization beam splitter 412 and is output as signal 16. This combined and twice-filtered signal is sent to a single detector, a detector system, or L-band, C-band, and reference signal photodetectors 122, 158, 160, depending on the implementation/embodiment.

Figure 8:
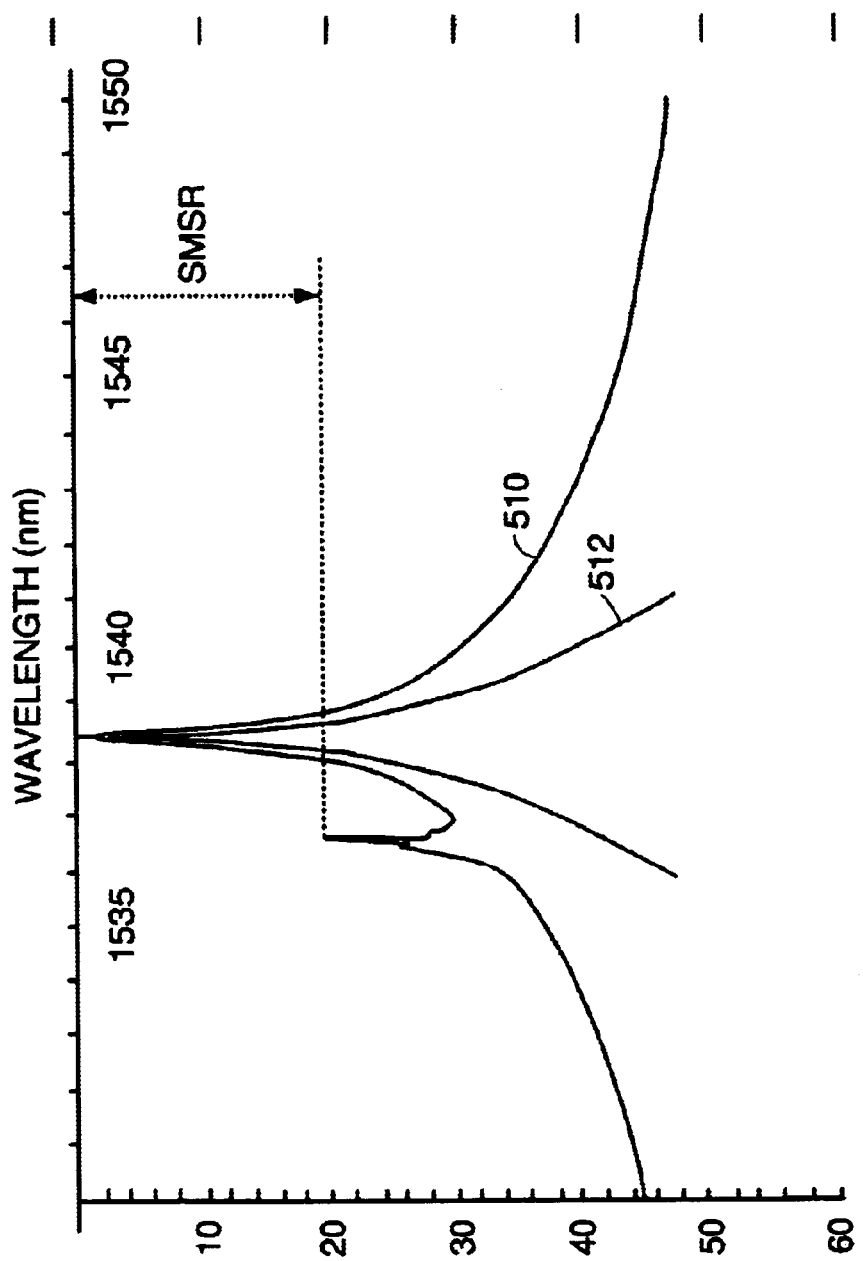
FIG. 8 is a spectral plot of the filter's transfer function in a single and double pass configuration, according to the invention.

FIG. 8 illustrates in increased wavelength selectivity obtained by the double pass or two filter cavity arrangement. The transfer function a single pass filter is illustrated by plot 510—whereas in the double-pass configuration, much steeper transfer function is achieved as illustrated by plot 512.

The double-pass or two filter cavity configuration has the advantage of also de-emphasizing any side lobes in the filter's transfer function.

Figure 9:
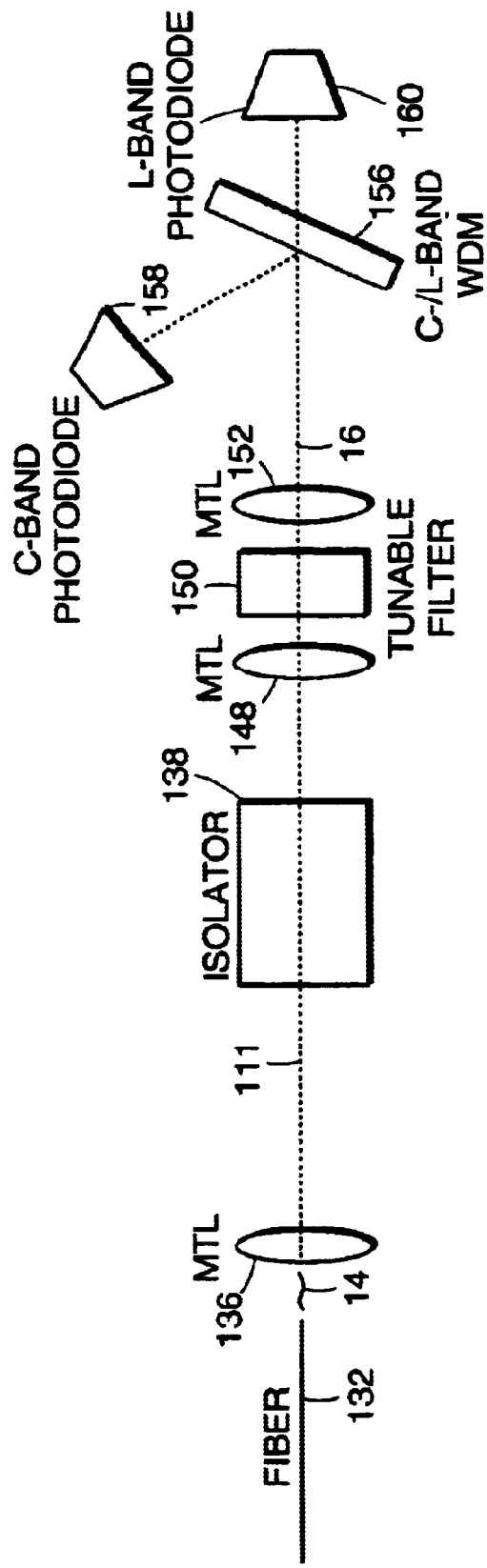
FIG. 9 is an optical train of an optical power monitor without the integrated reference signal source/detector.

FIG. 9 shows the optical train according to still another embodiment of the present invention. This configuration is termed an optical power monitoring system. The reference signal is not present. C-band and L-band photodiodes 158, 160, however, are provided. This is useful when the relative spacing of the optical channels 12 is important, but not necessarily the absolute wavelengths of those optical channels 12 in the optical signal 14.

While this invention has been particularly shown and described with references to preferred embodiments thereof, it will be understood by those skilled in the art that various changes in form and details may be made therein without departing from the scope of the invention encompassed by the appended claims.

What is claimed is:

1. An integrated optical monitoring system, comprising:
   a package;
   an optical bench sealed within the package;
   a fiber pigtail for transmitting an optical signal to the package;
   a tunable filter, connected to a top of the bench, that filters the optical signal supplied by the fiber pigtail; and
   a detector connected to the bench that detects the filtered optical signal from the tunable filter.

2. An optical monitoring system as claimed in claim 1, further comprising an isolator for suppressing back reflections into the fiber pigtail.

3. An optical monitoring system as claimed in claim 1, further comprising an isolator installed on the optical bench for suppressing back reflections into the fiber pigtail.

4. An optical monitoring system as claimed in claim 1, further comprising a reference signal source that venerates a reference signal that is filtered by the tunable filter.

5. An optical monitoring system as claimed in claim 1, further comprising a reference signal source, installed on the optical bench, which generates a reference signal that is filtered by the tunable filter.

6. An optical monitoring system as claimed in claim 5, Wherein the reference signal source comprises:
   a broadband source; and
   an etalon that generates a reference signal with stable spectral characteristics from broadband signal from the broadband source.

7. An optical monitoring system as claimed in claim 1, further comprising:
   a reference signal source, installed on the optical bench, that generates a reference signal that is filtered by the tunable filter; and
   a reference signal sensor that detects the reference signal which has been filtered by the tunable filter.

8. An optical monitoring system as claimed in claim 1, wherein the optical bench is smaller than 0.75 inches by 0.5 inches.

9. An optical monitoring system as claimed in claim 1, further comprising:
   a reference signal source, installed on the optical bench, that generates the reference signal;
   a collimating lens, installed on the optical bench, for improving the collimation of the reference signal;
   a combining filter, installed on the optical bench, that inserts the reference signal into a beam path of optical signal prior to filtering by the tunable filter;

a separation filter, installed on the optical bench, that separates the reference signal from the optical signal, post filteringo by the tunable filter; and a reference signal sensor, installed on the optical bench, that detects the reference signal from the separation filter.

10. A method for constructing an integrated optical monitoring system, comprising:

installing an optical bench in a hermetic package;

connecting a fiber pigtail to the package to provide an optical signal;

installing a tunable filter on a top of the bench to filter the optical signal from the fiber pigtail; and installing a detector on the bench to detect the filtered optical signal from the tunable filter.

11. A method as claimed in claim 10, further comprising installing an isolator on the bench to suppress back reflections into the fiber pigtail.

12. A method as claimed in claim 11, further comprising:

generating a reference signal; and filtering the reference signal with the tunable filter.

13. A method as claimed in claim 10, further comprising:

installing a reference signal source on the optical bench; and installing a combining filter on the optical bench to insert a reference signal from the reference source into a beam path of the optical signal.

14. A method as claimed in claim 13, wherein the step of installing the reference signal source comprises:

installing a broadband source; and installing etalon that converts emissions from the broadband source into a reference signal with stable spectral characteristics.

15. A method as claimed in claim 10, wherein the optical bench is smaller than 0.75 inches by 0.5 inches.

16. A method as claimed in claim 10, further comprising:

installing a reference signal source on the optical bench;

installing a collimating lens on the optical bench for improving collimation of the reference signal;

installing a combining filter on the optical bench that inserts the reference signal into a beam path of the optical signal prior to filtering by the tunable filter; and installing a separation filter on the optical bench that separates the reference signal from the optical signal post filtering by the tunable filter.

17. A method as claimed in claim 10, further comprising installing a lens optically between the fiber pigtail and the tunable filter on the bench to couple the optical signal into the tunable filter.

18. An optical monitoring system as claimed in claim 1, further comprising a lens installed optically between the fiber pigtail and the tunable filter on the bench for coupling the optical signal into the tunable filter.

19. An optical monitoring system as claimed in claim 1, wherein the fiber pigtail enters the package via a fiber feed-through to connect to the bench and terminate above the bench.

20. An optical monitoring system as claimed in claim 1, wherein the package is hermetic.

21. An optical monitoring system as claimed in claim 1, further comprising:

a reference signal source, installed on the optical bench, that generates the reference signal;

a reference source lens, installed on the optical bench, for improving the collimation of the reference signal;

a combining filter, installed on the optical bench, that inserts the reference signal into a beam path of optical signal prior to filtering by the tunable filter; and at least one optical signal lens in the beam path of the optical signal for coupling the reference signal and the optical signal into the tunable filter.

22. A method as claimed in claim 10, further comprising:

installing a reference signal source on the optical bench;

installing a reference source lens on the optical bench for improving collimation of the reference signal;

installing a combining filter on the optical bench that inserts the reference signal into a beam path of the optical signal prior to filtering by the tunable filter; and installing an optical signal lens between the combining filter and the tunable filter to couple the reference signal and the optical signal into the tunable filter.

23. An integrated optical monitoring system as claimed in claim 1, wherein the tunable filter is a Fabry-Perot filter.

24. An integrated optical monitoring system as claimed in claim 1, wherein The tunable filter is a MEMS Fabry-Perot filter.

* * * * *